United States Patent
Basham et al.

(10) Patent No.: US 7,289,885 B2
(45) Date of Patent: Oct. 30, 2007

(54) DUAL PURPOSE MEDIA DRIVE PROVIDING CONTROL PATH TO SHARED ROBOTIC DEVICE IN AUTOMATED DATA STORAGE LIBRARY

(75) Inventors: Robert B. Basham, Aloha, OR (US); Brian G. Goodman, Tucson, AZ (US); Leonard G. Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 11/298,780

(22) Filed: Dec. 9, 2005

(65) Prior Publication Data

US 2006/0089750 A1    Apr. 27, 2006

Related U.S. Application Data

(60) Division of application No. 09/853,557, filed on May 10, 2001, now Pat. No. 7,039,726, which is a continuation-in-part of application No. 08/931,856, filed on Sep. 16, 1997, now Pat. No. 6,434,090.

(51) Int. Cl.
   *G06F 19/00* (2006.01)

(52) U.S. Cl. ............... 700/246; 700/246; 700/247; 700/248; 700/251; 700/257; 700/258; 700/259; 700/260; 700/261; 700/262; 318/568.11; 318/568.12; 318/568.13; 318/568.16; 318/568.21; 600/117; 600/118; 600/407; 600/429; 600/587; 606/1; 606/102; 606/130; 606/139; 901/1; 901/2; 901/27

(58) Field of Classification Search ............... None
   See application file for complete search history.

(56) References Cited

U.S. PATENT DOCUMENTS

| 5,129,076 A |   | 7/1992 | Freeman et al. ............... 360/92 |
|---|---|---|---|
| 5,303,214 A | * | 4/1994 | Kulakowski et al. ...... 369/30.3 |
| 5,513,156 A |   | 4/1996 | Hanaoka et al. .............. 369/34 |
| 5,522,090 A | * | 5/1996 | Tanaka et al. ................. 710/74 |
| 5,546,366 A |   | 8/1996 | Dang .......................... 369/36 |

(Continued)

OTHER PUBLICATIONS

IBM Technical Disclosure Bulletin, vol. 34, No. 6, Nov. 1991, "Data Sharing for Cooperative Processing in Heterogeneous Environment", pp. 20-21.

(Continued)

*Primary Examiner*—Thomas Black
*Assistant Examiner*—Marc McDieunel
(74) *Attorney, Agent, or Firm*—John H. Holcombe

(57) ABSTRACT

A dual purpose media drive exchanges data with removable media items. The drive includes at least one port to receive various control signals, including (1) data exchange commands directing the drive to read and/or write data to a media item mounted by the drive, and (2) robotic device management commands. The drive includes a processor that responds to incoming data exchange commands by reading and/or writing to the loaded media item. The processor responds to at least some robotic device management signals by forwarding them to a robotic media transport device. The processor withholds the data exchange commands from the robotic device, since they are only pertinent to operations of the drive itself. The robotic device may be configured to restrict host access to library components according to predefined logical partitions.

13 Claims, 11 Drawing Sheets

U.S. PATENT DOCUMENTS

| | | | |
|---|---|---|---|
| 5,570,337 A | 10/1996 | Dang | 369/192 |
| 5,594,922 A | 1/1997 | Suzuki et al. | 395/837 |
| 5,703,843 A | 12/1997 | Katsuyama et al. | 369/34 |
| 5,761,161 A | 6/1998 | Gallo et al. | 369/36 |
| 5,878,270 A | 3/1999 | Kobayashi | 395/821 |
| 6,073,218 A | 6/2000 | DeKoning et al. | 711/150 |
| 6,098,114 A | 8/2000 | McDonald et al. | 710/5 |
| 6,105,103 A | 8/2000 | Courtright, II et al. | 711/1 |
| 6,532,401 B2 * | 3/2003 | Benson et al. | 700/245 |
| 7,177,723 B2 * | 2/2007 | Starr et al. | 700/264 |

OTHER PUBLICATIONS

IBM Technical Disclosure Bulletin, vol. 36, No. 10, Oct. 1993, "Improved Disconne-t/Reconnect Criteria in Data Storage Devices", pp. 175-177.

* cited by examiner

DUAL PURPOSE MEDIA DRIVE PROVIDING CONTROL PATH TO SHARED ROBOTIC DEVICE IN AUTOMATED DATA STORAGE LIBRARY

CROSS-REFERENCE TO RELATED APPLICATIONS

This application is a Divisional Application of co-pending U.S. application Ser. No. 09/853,557, filed May 10, 2001, which application is a continuation-in-part of U.S. application Ser. No. 08/931,856, filed on Sep. 16, 1997 in the names of Basham et al. and entitled "AUTOMATED DATA STORAGE LIBRARY WITH CONTROL PATH TO SHARED ROBOTIC DEVICE VIA MEDIA DRIVE" now issued as U.S. Pat. No. 6,434,090. The entirety of the foregoing application is hereby incorporated herein by reference.

BACKGROUND OF THE INVENTION

1. Field of the Invention

The present invention relates to automated data storage libraries that manage the loading and unloading of portable data storage media to/from media drives as well as data exchange occurring with media loaded in such drives. More particularly, the invention concerns a data storage library featuring a dual purpose data/control path between a host computer and a media drive, this path conveying control signals and data between the host and drive, and also conveying robotic control signals from the host via the drive to a robotic device coupled to the drive.

2. Description of the Related Art

One of the most popular types of mass storage system today is the data storage "library". Generally, a data storage library connotes a great number of commonly housed portable ("removable") data storage media, which are transported among various storage bins and read/write media drives by a robotic device. These libraries have become popular for many reasons. First, the portable data storage media, usually magnetic tape or optical media, are typically quite inexpensive relative to other storage formats such as magnetic disk drives. Furthermore, libraries are easily expanded to accommodate more data, by simply adding more items of media. Additionally, most libraries can be easily updated with new equipment as it comes onto the market. For example, a new media drive may be introduced to the library to supplement or replace the existing media drives.

A number of different companies manufacture libraries today, each model displaying various different features and operating principles. One significant manufacturer of data storage libraries is International Business Machines Corp. (IBM), which provides a number of different libraries having widespread use and commercial success. Nonetheless, IBM has continually sought to improve various aspects of their libraries.

One area of focus is cost reduction, and more particularly, cutting hardware costs by designing libraries that share various components. It is often difficult, however, to design components that perform multiple functions or that respond to plural master units. Frequently, this level of flexibility requires the addition of a cumbersome layer of coordinating or supervising software code, which can ultimately reduce the performance of other unrelated aspects of the library. For instance, developing software to enable multiple incompatible hosts to manage a shared inventory of media items may be prohibitively difficult or expensive in many situations.

Another difficulty concerns the need to prevent different hosts from interfering with each other's manipulation of media items in the shared library.

In other cases, a shared component may need to include another port for each host, thus increasing the hardware cost of the shared component. Furthermore, some configurations experience incompatibility when multiple components share a bus or other feature, resulting in reduced or lost data availability. Thus, engineers are confronted with a number of difficult challenges in their quest to consolidate components in a data storage library to reduce hardware expenses.

SUMMARY OF THE INVENTION

Broadly, the present invention concerns a dual purpose drive for exchanging data with removable media items. The drive includes at least one host port to receive various control signals, including (1) data exchange commands directing the drive to read and/or write data to a media item mounted by the drive, and (2) robotic device management commands. The drive includes a processor that responds to incoming data exchange commands by reading and/or writing to the loaded media item. The processor responds to at least some robotic device management signals by forwarding them to a robotic media transport device. The processor withholds the data exchange commands from the robotic device, since they are only pertinent to operations of the drive itself. The robotic device may be configured to restrict host access to library components according to predefined logical partitions.

Thus, in one embodiment, the invention may be implemented to provide an apparatus such as a dual purpose media drive for use in a data storage library, or a robotic device configured to restrict host access according to various logical partitions. In another embodiment, the invention may be implemented to provide a method to operate a data storage library, robotic device, or dual purpose media drive therein. In still another embodiment, the invention may be implemented to provide a signal-bearing medium tangibly embodying a program of machine-readable instructions executable by a digital data processing apparatus to perform operations as discussed herein. Another embodiment concerns logic circuitry comprising interconnected circuit elements configured to cooperatively perform operations as discussed herein.

The invention affords its users with a number of distinct advantages. Significantly, the invention may be implemented to save hardware costs, since components such as media drives may be used for multiple purposes, and even shared by different host computers. Furthermore, the invention avoids complicated host software that would otherwise be required to operate shared components. In addition, with multiple master or relay drives, the invention advantageously provides redundant paths to the robotic device, available when a desired path to the robotic device fails or is otherwise unavailable. Also, the library of the invention is beneficial because it enables a heterogeneous mix of otherwise incompatible hosts to share a single robotic device and a common inventory of media items. The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections

One aspect of the invention concerns a data storage library, which may be embodied by a number of different embodiments, each including a distinctive arrangement of various hardware components and interconnections.

Dual Purpose Data/Control Path

Figure 1:
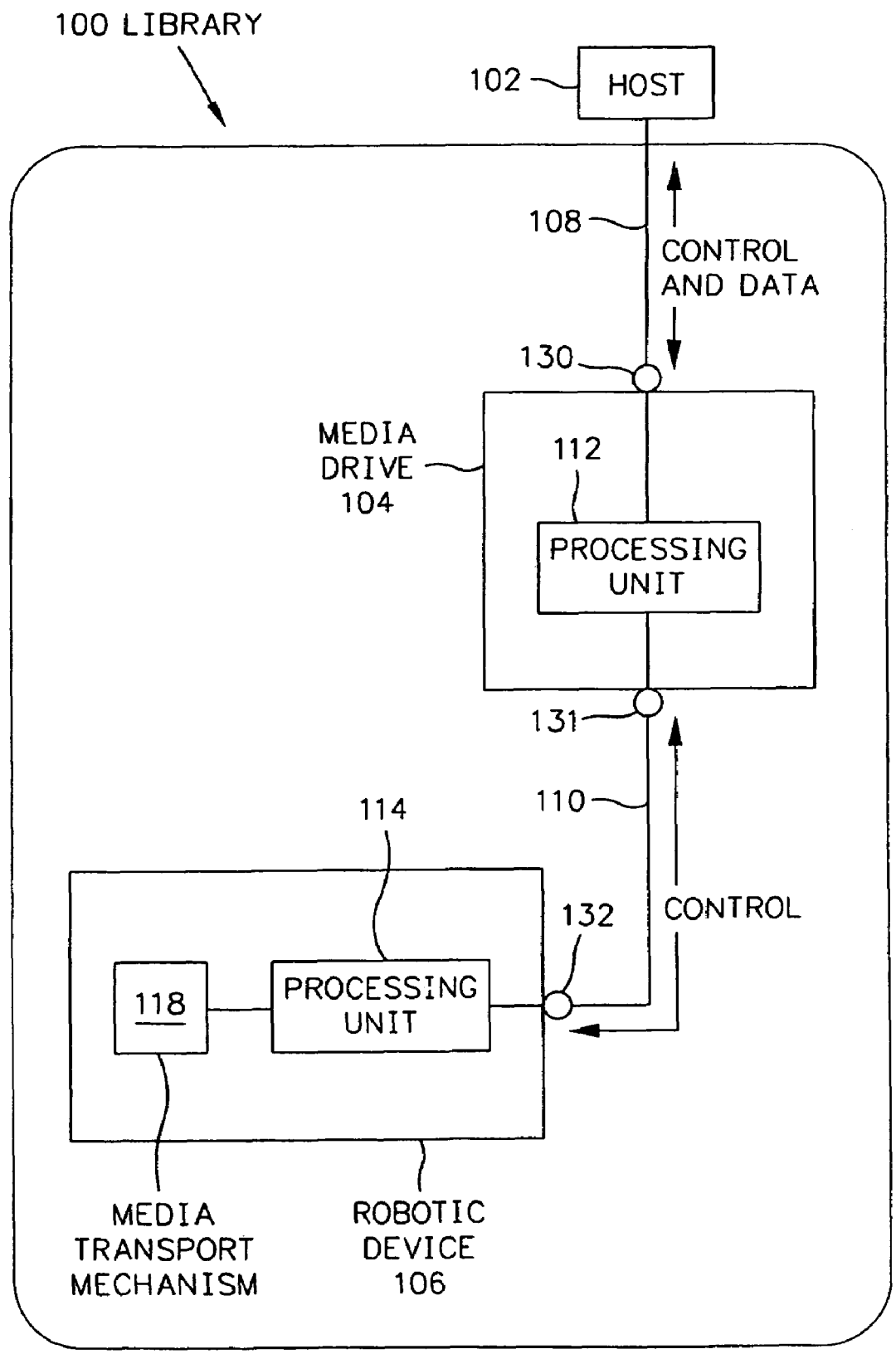
FIG. 1 is a block diagram of the hardware components and interconnections of a single host data storage library with a shared data/control path between a drive and a robotic device, in accordance with the invention.

FIG. 1 illustrates one embodiment of data storage library according to the invention, in the form of a library 100. Chiefly, the library 100 is attached to a host 102, and includes a media drive 104 and a robotic media transport device ("robotic device") 106. A dual purpose communications path 108 interconnects the host 102 and drive 104. Similarly, a communications path 110 interconnects the drive 104 and the robotic device 106. The paths 108, 110 may comprise any suitable means for conveying signals, such as a bus with one or more conductive members (such as wires, conductive traces, cables, etc.), wireless communications (such as radio frequency or other electromagnetic signals, infrared communications, etc.), fiber optic communications, or another suitable path. Furthermore, the paths 108, 110 may employ serial, parallel, or another communications format, using digital or analog signals as desired.

The dual purpose communications path 108 is coupled to the drive 104 via a communications port 130. The port 130 is referred to as a "host port" because it links the drive 104 to the host. Alternatively, the dual purpose communications path 108 may be located in the drive 104. In this case, two or more host ports 130 may be provided on the drive 104. Still further, more than one host may be connected to the path 108, allowing multiple hosts to access the same drive 104. In the illustrated embodiment, the host port 108 may comprise a small computer system standard interface (SCSI), although other interfaces may be used, such as parallel ports, serial ports, fiber optic link, wireless links, etc. The path 110 interconnects the drive 104 and robotic device 106 via communications ports 131-132, called a robotic device port and a drive port, respectively. The ports 131-132 preferably comprise multi-conductor register ports, which are known in the art, or another suitable arrangement such as serial ports, fiber optic links wireless links, etc. For ease of reading, each port is named for the component that it exchanges signals with over the path attached to that port.

Both the drive 104 and the robotic device 106 include respective processing units 112, 114. As illustrated, the library 100 manages the positioning and access of "removable" or "portable" data storage media such as magnetic tape, optical tape, optical disk, removable magnetic disk drive, CD-ROM, compact flash memory, smart media, electronic modules, digital video disk (DVD), or another appropriate format. Some of these types of storage media may be self-contained within a portable container, or "cartridge". For universal reference to any of these types of storage media, this disclosure refers to "items" or "units" of media.

The host 102 may comprise a mainframe computer, workstation, personal computer, network, or another means for exchanging data and control signals with the media drive 104. Preferably, the host 102 comprises a computing machine such as an IBM brand RS/6000 server with an IBM POWER-PC processor.

The drive 104 comprises a machine for reading data from and/or writing data to portable data storage media such as those mentioned above. As a more specific example, the drive 104 may comprise an IBM model 3570 or 3590 tape drive; in this case, the processing unit 112 comprises one or more microprocessors.

Accordingly, one purpose of the dual purpose path 108 is to conduct data back and forth between the host 102 and the drive 104, where such data is written to and/or read from a media item mounted to the drive 104. Another purpose of the path 108 is to conduct control signals between the host 102 and drive 104. These control signals may comprise (1) signals used to control the access of media at the drive 104, as well as (2) high-level robotic device management signals being forwarded from the host 102 to the processing unit 112. If desired, the path 108 may also carry response signals returned by the processing unit 114 to the host 102.

In one embodiment, where the host port 130 comprises a SCSI interface, the dual purpose path 108 may be implemented by programming the port 130 with a command protocol that recognizes one "address" for drive functions, and another address for the robotic device 106. Each of these addresses preferably comprises a "logical unit number", known to those familiar with SCSI devices as "LUN". Thus, in the example of FIG. 1, the host 102 directs data exchange commands to a first LUN (e.g., LUN-0) associated with the drive 104, whereas the host 102 directs robotic device management commands to a different LUN (e.g., LUN-1) assigned to the robotic device 106.

In contrast to the path 108, the path 110 carries control signals such as high-level robotic device management signals forwarded by the drive's processing unit 112 to the robotic device's processing unit 114. The path 110 may also return response signals from the robotic device's processing unit 114 to the processing unit 112.

Dual Purpose Media Drive

Figure 12:
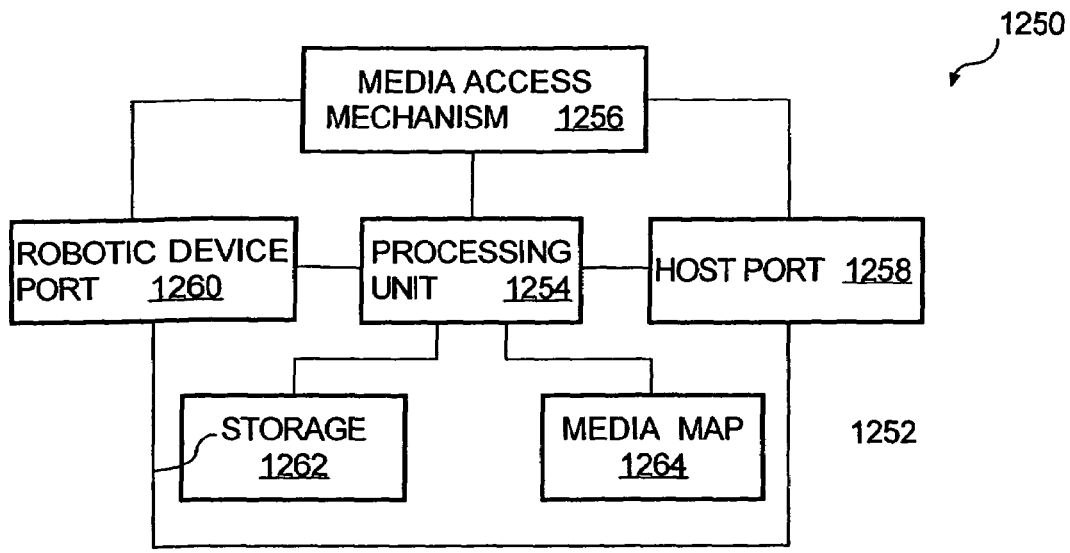
FIG. 12 is a block diagram of the hardware components and interconnections of an exemplary dual purpose media drive, in accordance with the invention.

FIG. 12 provides a more particular description of an exemplary dual purpose media drive, such as the media drive 104 from FIG. 1. Broadly, the illustrated media drive 1250 comprises a machine for reading data from and/or writing data to portable data storage media such as those mentioned above. The drive 1250 includes a case 1252, which may be embodied by a housing, frame, rack, printed circuit board, or other structure. Various components are located within, mounted to, or otherwise provided with the case 1252. Namely, FIG. 12 illustrates a processing unit 1254, a media access mechanism 1256, storage 1262, media map 1264, host port 1258, and robotic device port 1260.

The media access mechanism 1256 comprises mechanical hardware, electronics, and software/firmware to load, eject, and exchange data with portable media items. The mechanism 1256 may comprise a read-only unit, write-only unit, or read/write unit. The media access mechanism 1256 is compatible with media items of predetermined configuration, such as magnetic tape, optical tape, optical disk, removable magnetic disk drive, CD-ROM, electronic module, smart media, compact flash memory, digital video disk (DVD), etc. For instance, in the case of magnetic tape media, the media access mechanism 1256 includes a tape head, tape path, advance/rewind motor, ejection hardware, and the like. As a more specific example, the mechanism 1256 may comprise relevant hardware from an IBM model 3570 or 3590 tape drive. The mechanism 1256 operates according to electronic instructions from the processing unit 1254.

Each of the ports 1258, 1260 (also shown as 130, 131, FIG. 1) comprises one or more multi-conductor register ports, electrical connectors, electrical ports, infrared ports, intelligent interfaces, cables, wireless interfaces, SCSI ports, Fibre Channel connectors, fiber optic links, or any other mechanism to relay signals between the processing unit 1254 and components external to the drive 1250. More particularly, the host port 1258 may comprise a connector that is directly compatible with a host, a connector that is compatible with another connector that is itself compatible with the host, etc. The robotic device port 1260 comprises a connector that is compatible with the robotic device 106 (FIG. 1), a connector that is compatible with another connector that is itself compatible with the robotic device 106, etc. In the illustrated example, the host port 1258 couples to host 102 (FIG. 1) via the dual purpose communications path 108, and the robotic device port 1260 couples to the robotic device 106 via the communications path 110.

The processing unit 1254 (also shown as 112, FIG. 1) comprises one or more digital data processing machines, such as microprocessors, signal processing circuitry, ASICs, logic circuitry, discrete circuitry, computers, or other data processor. As a specific example, the processing unit 1254 may comprise an IBM POWER-PC processor. The processing unit 1254 may also be referred to as a controller. In addition to the mechanism 1256, the processing unit 1254 is coupled to the storage 1262, media map 1264, and interfaces 1258-1260. The storage 1262 comprises digital data storage such one or more RAM modules, battery-backup RAM units, ROM modules, flash PROM, hard disk drive, registers, buffers, or other digital data storage device(s). The storage 1262 may be utilized, for example, to store machine-readable instructions for execution by the processing unit 1254, or to store results of computation by the controller 1254, or another purpose. In embodiments where the processing unit 1254 is implemented by discrete or logic circuitry rather than an instruction-processing unit, the storage 1262 may be omitted from the drive 1250 if there is no other use for the storage 1262. The storage 1262 may reside in the processing unit 1254, if desired.

The media map 1264, an optional component, contains information identifying the components of any partition associated with the drive 1250. Namely, the media map 1264 contains mapping information designating all constituent components of the applicable partition, these components including any one or more of the following library components: one or more other media drives, one or more media items, one or more storage bins for media items, one or more import/export regions, etc. Thus, in the cases where the media drive 1250 is assigned to a partition, media map 1264 identifies all components of that partition. As discussed in greater detail below, the media drive 1250 uses the media map 1264 to restrict host media transport commands (arriving at the interface 1258) to components of the library that fall under the applicable host partition. Optionally, the media map 1264 may also list the location of each media item in the drive's partition, i.e., storage bin, in-transit, loaded in the mechanism 1256, etc. Optionally, the media map 1264 may reside in the robotic device 106.

Broadly, the processing unit 1254 responds to input signals on the host port 1258, determining whether the input signals contain data exchange commands or robotic device management commands. For any data exchange commands, the processing unit 1254 directs the media access mechanism 1256 to perform an operation such as (1) exchanging data with a media item received by the media access mechanism, or (2) returning status information concerning the media drive upon the host port 1258. For any robotic device management commands, the processing unit 1254 forwards such commands to the robotic device 106 via the port 1260. As discussed in greater detail below, the processing unit 1254 may even be recruited by the robotic device 106 to handle certain robotic device management signals. The drive 1250 is used to implement the "master" and "relay" drives (discussed below); the drive 1250 may (as discussed below) also be used to implement "orphan" drives as well, although this is not necessary.

Master/Relay Drive Pair with Shared Robotic Device

Figure 2:
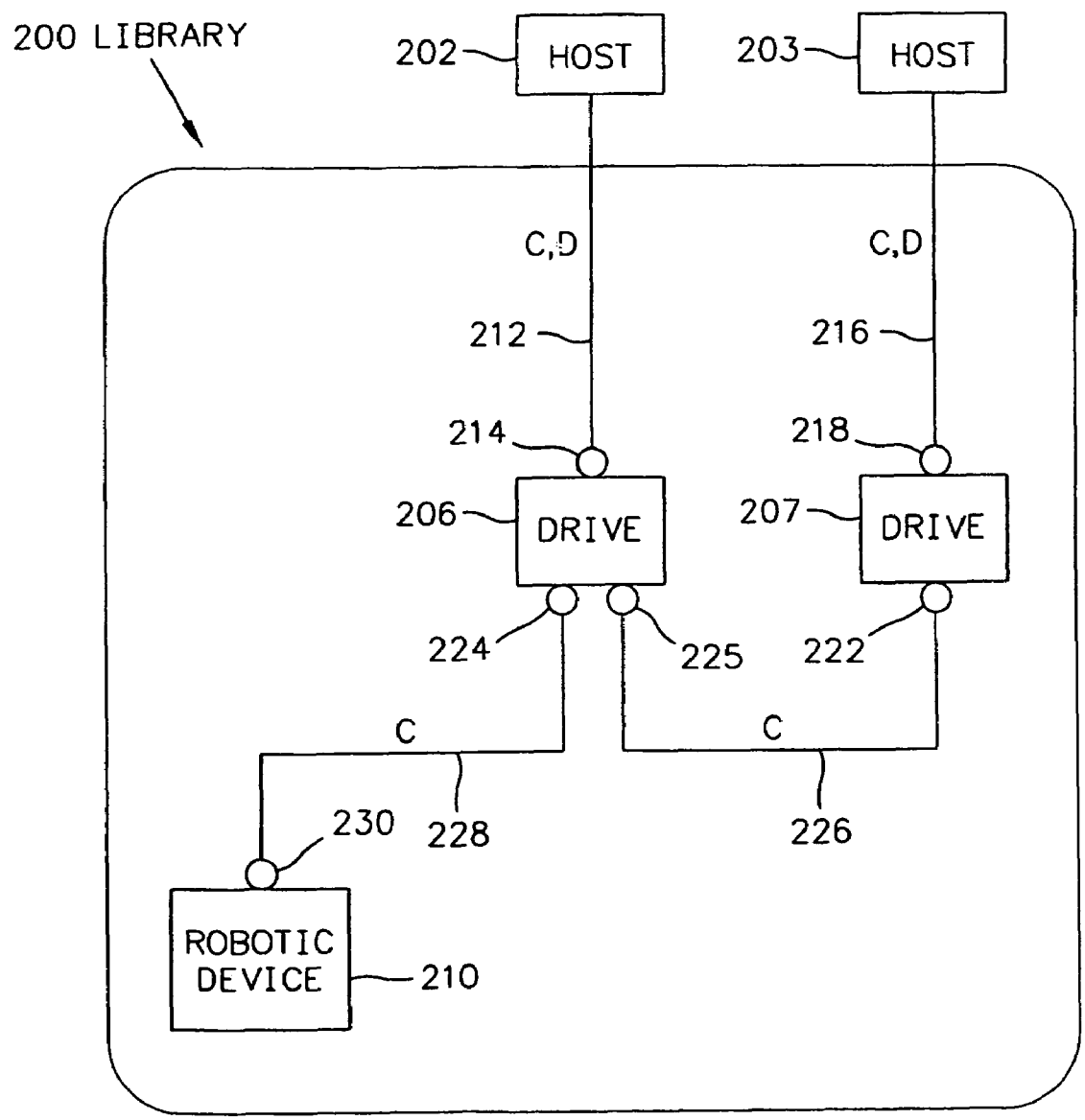
FIG. 2 is a block diagram of the hardware components and interconnections of a multi-host data storage library with master/relay configured drives having a shared data/control path to a shared robotic device through the master drive, in accordance with the invention.

FIG. 2 illustrates a different embodiment of library according to the invention, in the form of a library 200. The library 200 is coupled to multiple hosts 202-203, numbering two in the present example. The library includes a master media drive 206, a relay media drive 207, a robotic device 210, and various interconnecting paths. All robotic device management signals are relayed to the robotic device 210 via the master drive 206, whether these signals originate at the host 202 or 203. For ease of reference, FIG. 2 illustrates paths carrying control signals with a "C", and paths carrying data with a "D".

Considering FIG. 2 in more detail, each host 202-203 is coupled to a corresponding drive 206-207 by one of the dual purpose communications paths 212/216. As illustrated, the hosts 202-203 couple to host ports 214/218 of the drives 206-207. Preferably, the host ports 214/218 comprise SCSI, although other interfaces may be used, such as parallel ports, serial ports, fiber optic link, wireless links, etc. Each path 212/216 carries control signals as well as data between a host and a drive. Accordingly, the paths 212/216 may comprise any suitable means for conveying signals, such as a bus with one or conductive members (such as wires, conductive traces, cables, etc.), wireless communications (such as radio frequency or other electromagnetic signals, infrared communications, etc.), fiber optic communications, or another suitable path. Furthermore, the paths 212, 216 may employ serial, parallel, or another communications format, using digital or analog signals as desired.

All robotic device management signals are ultimately relayed to the robotic device 210 by the master drive 206. For this purpose, the drives 206-207 include drive ports 225/222 interconnected by a communications path 226. The path 226 chiefly carries robotic device management signals from the relay drive 207 (originating from the host 203) and passes these signals to the master drive 206 (which forwards these signals to the robotic device 210). Although the drive ports 225/222 preferably comprise serial ports, with the path 226 comprising a serial bus, these components may be implemented in various other forms, as discussed above in the context of the ports and paths of FIG. 1.

Robotic device management signals from the master drive 206 transit a communications path 228 connecting a drive port 230 of the robotic device 210 to a robotic device port 224 of the master drive 206. The ports 230/224 may comprise a known port such as a multi-line parallel "register" port, or a different novel or known port configuration.

As shown above, then, the path between each of the hosts 202-203 and the robotic device 210 shares a common portion between the master drive 206 and the robotic device 210. In one embodiment, where the host ports 214/218 comprise SCSI interfaces, the dual purpose paths 212/216 may be implemented by programming each port 214/218 with a command protocol recognizing different LUN for drive functions and robotic device management signals, as discussed above.

Multi-Drive with Common Drive Path to Shared Robotic Device

Figure 3:
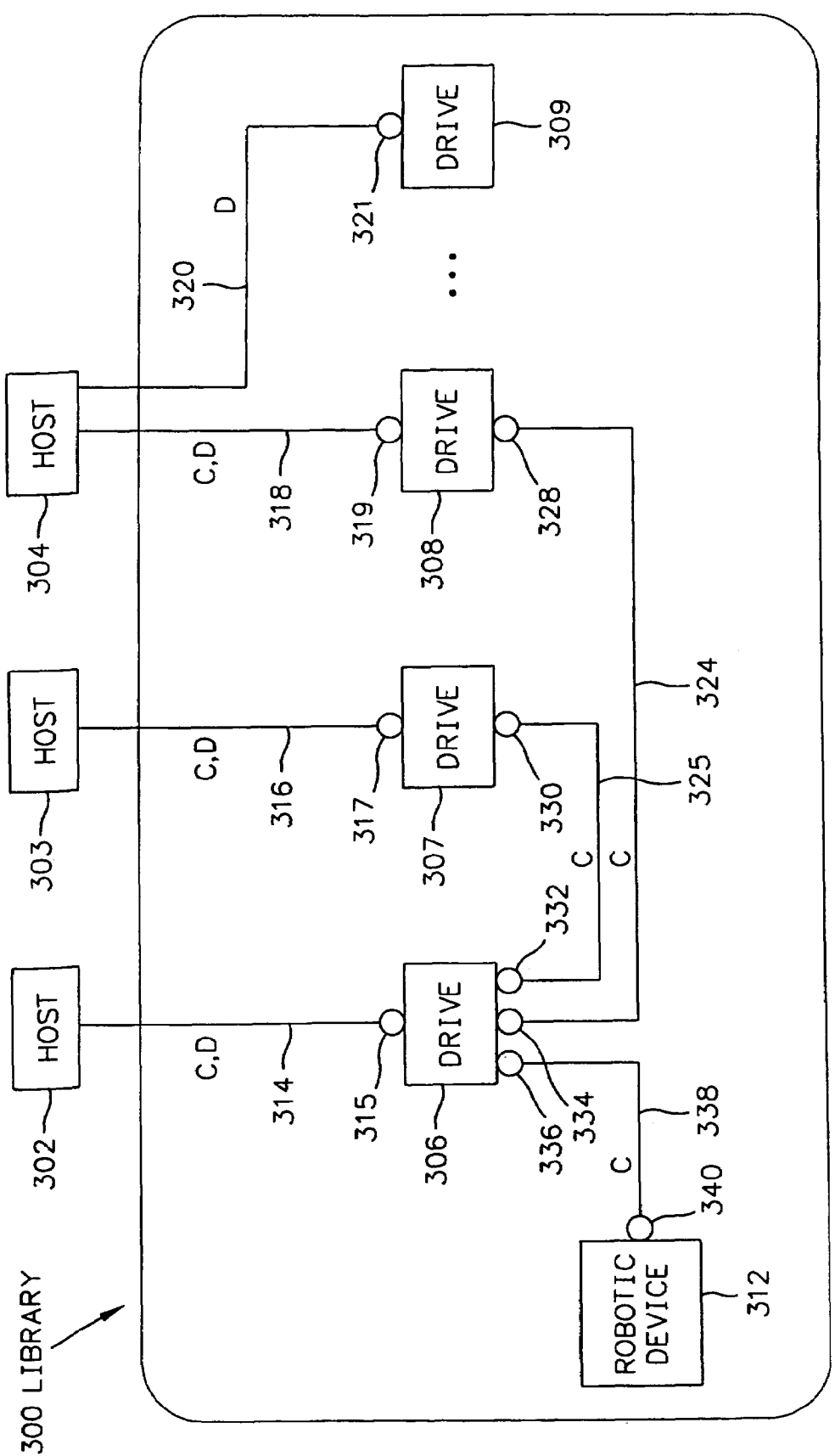
FIG. 3 is a block diagram of the hardware components and interconnections of a multi-host data storage library with multiple drives each accessing a shared robotic device through a designated master drive directly coupled to the robotic device, in accordance with the invention.

FIG. 3 illustrates a different embodiment of library according to the invention, in the form of a library 300. The library 300 is coupled to multiple hosts 302-304, numbering three in the present example. The library 300 includes multiple media drives 306-309 interconnected to the robotic device 312 via the drive 306, which is a "master" drive. Each host 302-304 is coupled to one or more of the media drives 306-309. As in FIGS. 1 and 2, all robotic device management signals are relayed through the master drive to the robotic device. However, in this example, there are more hosts and more drives, and one host 304 is coupled to multiple drives 308-309, one of which lacks a path to the robotic device 312. The drives 307-308 are "relay" drives, whereas the drive 309 without any connection to the master drive 306 is an "orphan" drive.

Considering FIG. 3 in more detail, the hosts 302-304 are coupled to the drives 306-309 by communications paths 314, 316, 318, and 320. As illustrated, the hosts 302-304 couple to host ports 315/317/319/321 of the drives 306-309. Each path 314/316/318 carries robotic device management signals from a host to the robotic device 312, and also carries control and data signals from a host to a drive. These paths therefore constitute dual purpose communications paths. The path 320 is not a dual purpose communications path because the drive 309 does not provide a path for robotic device management signals to the robotic device 312.

Robotic device management signals directed to any of the drives 306-308 are ultimately relayed to the robotic device by the master drive 306. For this purpose, the drives 306-307 include drive ports 332/330 interconnected by a communications path 325; likewise, the drives 306/308 include drive ports 334/328 connected by a communications path 324. Each path 325/324 chiefly carries robotic device management signals from the drives 307/308 (originating from the hosts 303-304, respectively) and passes these signals to the drive 306 (which forwards these signals to the robotic device 312). All robotic device management signals thereafter transit a communications path 338 connecting a drive port 340 of the robotic device 312 to a robotic device port 336 of the master drive 306. Thus, the paths between the hosts 302-304 and the robotic device 312 share a common portion between the master drive 306 and the robotic device 312.

In one embodiment, where the host ports 315/317/319 comprise SCSI interfaces, the dual purpose paths 314/316/318 may be implemented by programming each port 315/317/319 with a command protocol recognizing different LUN for drive functions and robotic device management signals, as discussed above. The hosts, drives, ports, communications paths, robotic device, and related media items of FIG. 3 may be implemented using components discussed more specifically above.

Multi-Drive with Multiple Drive Paths to Shared Robotic Device

Figure 4:
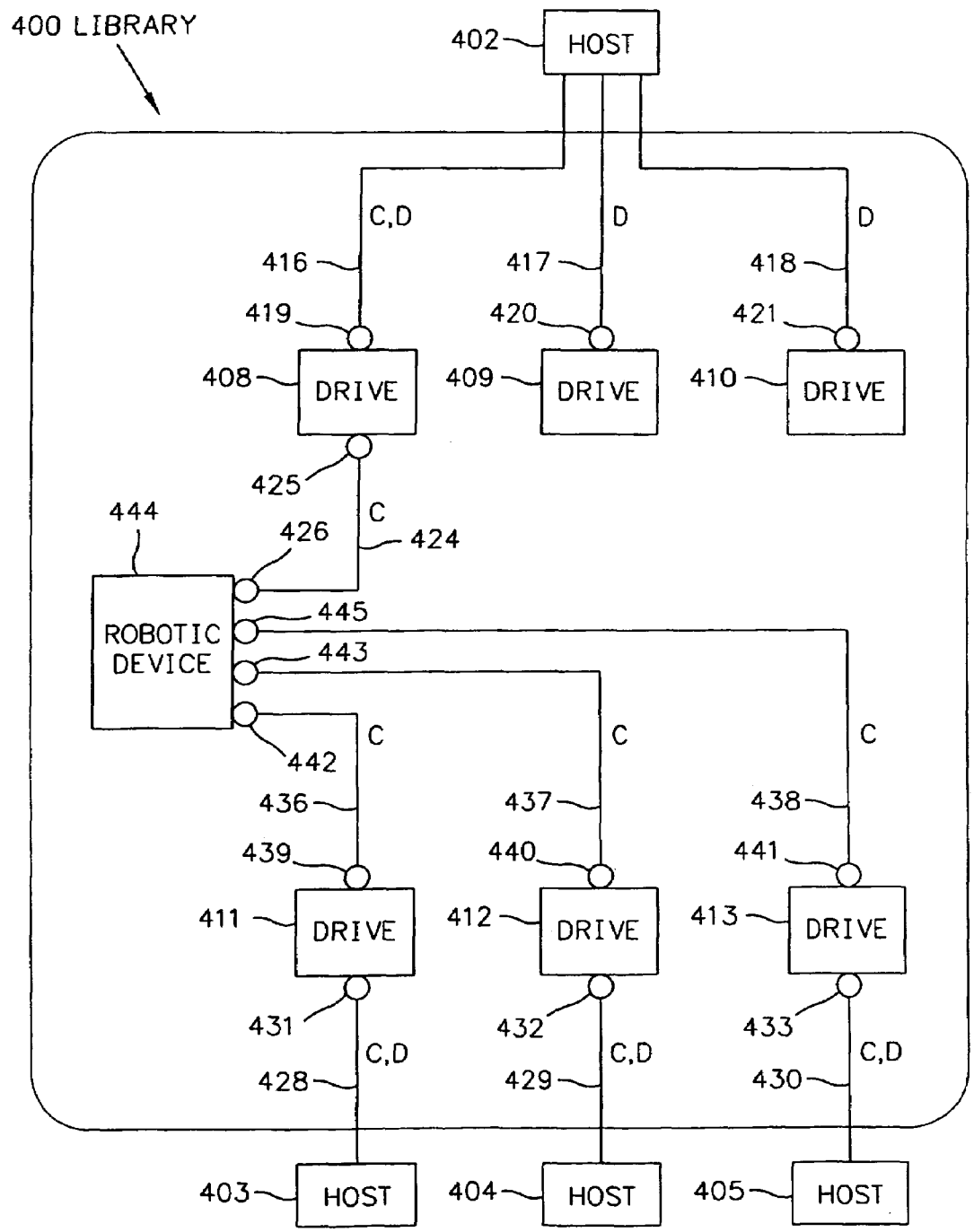
FIG. 4 is a block diagram of the hardware components and interconnections of a multi-host data storage library with point-to-point connection between multiple relay drives and a shared robotic device, in accordance with the invention.

FIG. 4 illustrates still another embodiment of library according to the invention, in the form of a library 400. The library 400 is coupled to multiple hosts 402-405, numbering four in the present example. Each host 402-405 is coupled to one or more media drives 408-413. The media drives 408/411-413 are coupled to a robotic device 444, these drives being called "relay" drives, since they relay robotic device management signals from the hosts 402-405 to the robotic device 444. Each relay drive being separately connected to the robotic device 444, this arrangement is referred to as "point-to-point". Drives without any coupling to the robotic device 444, such as the drives 409-410, are called "orphan" drives.

Each host forwards its robotic device management signals through an attached relay drive to the robotic device 444. For example, the host 402 sends its robotic device management signals through its relay drive 408; the remaining drives 409-410, orphan drives, are used for data retrieval and storage only. Since the hosts 403-405 have only one drive 411-413 each, and each drive 411-413 is a relay drive, all robotic device management signals are sent through the respective attached drive 411-413.

Each host 402-405 is coupled to its drive(s) by communications paths 416-418 and 428-430. As illustrated, the hosts 402-405 couple to the drives via communication ports 419-421 and 431-433. Each communications path 416 and 428-430 carries robotic device management signals as well as drive-related data and control signals, whereas the communications paths 417-418 need only carry drive-related data and control signals, since the orphan drives 409-410 do not provide paths to the robotic device 444.

Robotic device management signals directed to the relay drives 408 and 411-413 pass to the robotic device 444 through respective robotic device ports 425 and 439-441, communication paths 424 and 436-438, and drive ports 426 and 442, 443, 445. The drive ports 426 and 442, 443, 445 preferably comprise serial ports, such as RS-232 or RS422 standard serial ports. Likewise, the robotic device ports 425 and 439-441 preferably comprise serial ports, although other suitable arrangements may be used instead. Accordingly, the paths 424 and 436-438 preferably comprise multi-line busses appropriate to conduct the needed serial communications. As for the remaining components of FIG. 4, such as the drives, ports, hosts, communications paths robotic device, and related media items, these components may be implemented using components discussed more specifically above.

Multi-Drive Loop Connection to Shared Robotic Device

Figure 5:
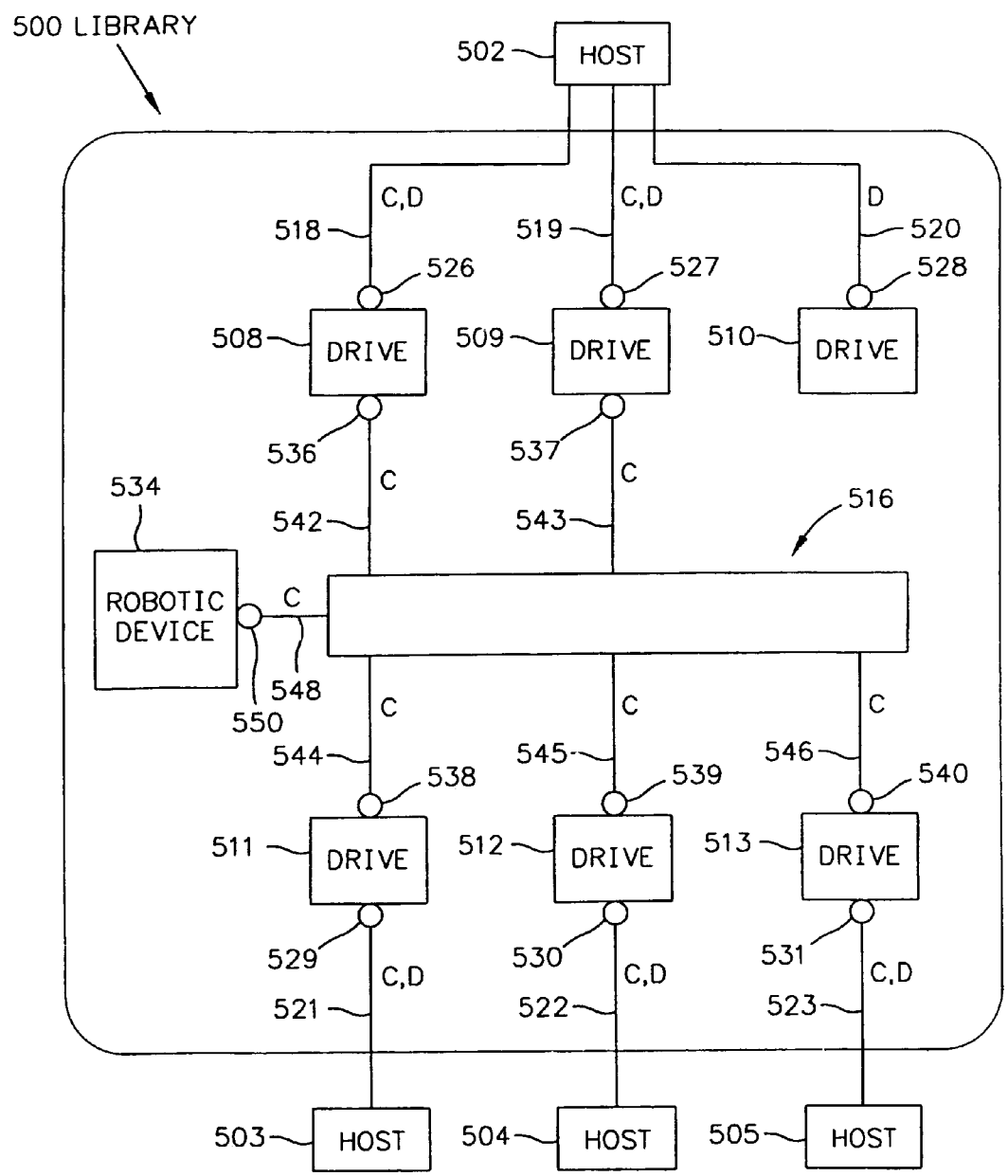
FIG. 5 is a block diagram of the hardware components and interconnections of a multi-host data storage library with multiple relay drives each accessing a shared robotic device through a communications loop coupled to the robotic device, in accordance with the invention.

FIG. 5 illustrates still another embodiment of library according to the invention, in the form of a library 500. The library 500 is coupled to multiple hosts 502-505, numbering four in the present example. Each host 502-505 is coupled to one or more media drives 508-513. The media drives 508-509 and 511-513 are coupled to a robotic device 534 via a communications loop 516; these drives 508-509 and 511-513 are called "relay" drives since they relay robotic device management signals from the hosts 502-505 to the robotic device 534. Lacking any connection to the robotic device 534, the drive 510 is an "orphan" drive.

Each host forwards its robotic device management signals through an attached relay drive to a communications loop 516, which is coupled to a robotic device 534. For example, the host 502 sends its robotic device management signals to the robotic device through either one of the relay drives 508-509; the remaining drive 510 is used for data retrieval and storage only. Since the hosts 503-505 have only one drive 511-513 each, and each drive 511-513 is a relay drive, all robotic device management signals are sent through the respective attached drive 511-513.

Each host 502-505 is coupled to its drive(s) by communications paths 518-523, which are coupled to host ports 526-531. Each communications path 518-519 and 521-523 carries robotic device management signals as well as drive-related data and control signals, whereas the path 520 need only carry drive-related data and control signals, since the orphan drive 510 does not provide a path to the robotic device 534.

Robotic device management signals directed to the drives 508-509 and 511-513 pass to the robotic device 534 through respective robotic device ports 536-540, communication paths 542-546, the communications loop 516, a communications path 548, and a drive port 550. One particular advantage of the library 500 is that the host 502 has redundant connections to the loop 516; thus, the remaining drive 508-509 can still provide access to the loop 516 if the route through one drive 508-509 somehow fails.

The loop 516 preferably comprises a "closed loop", meaning that each attached drive has two possible paths through the loop to any destination. In other words, any single break in the loop does not impede communications of the components interconnected by the loop. As a specific example, the loop 516 may be provided by a serial storage architecture (SSA) interface, fibre channel arbitrated loop (FC-AL) interface, or an arbitrated synchronous data link control (SCLC), the foregoing loops being well known in the applicable art. The hosts, drives, ports, communications paths, robotic device, and related media items may be implemented using components such as those discussed above. Alternatively, a multi-drop connection may be used where the loop 516 is replaced with a common bus such as a multi-drop serial network, e.g., controller area network (CAN).

Multi-Drive Loop Connection with Shared Drive Path(s) to Shared Robotic Device

Figure 6:
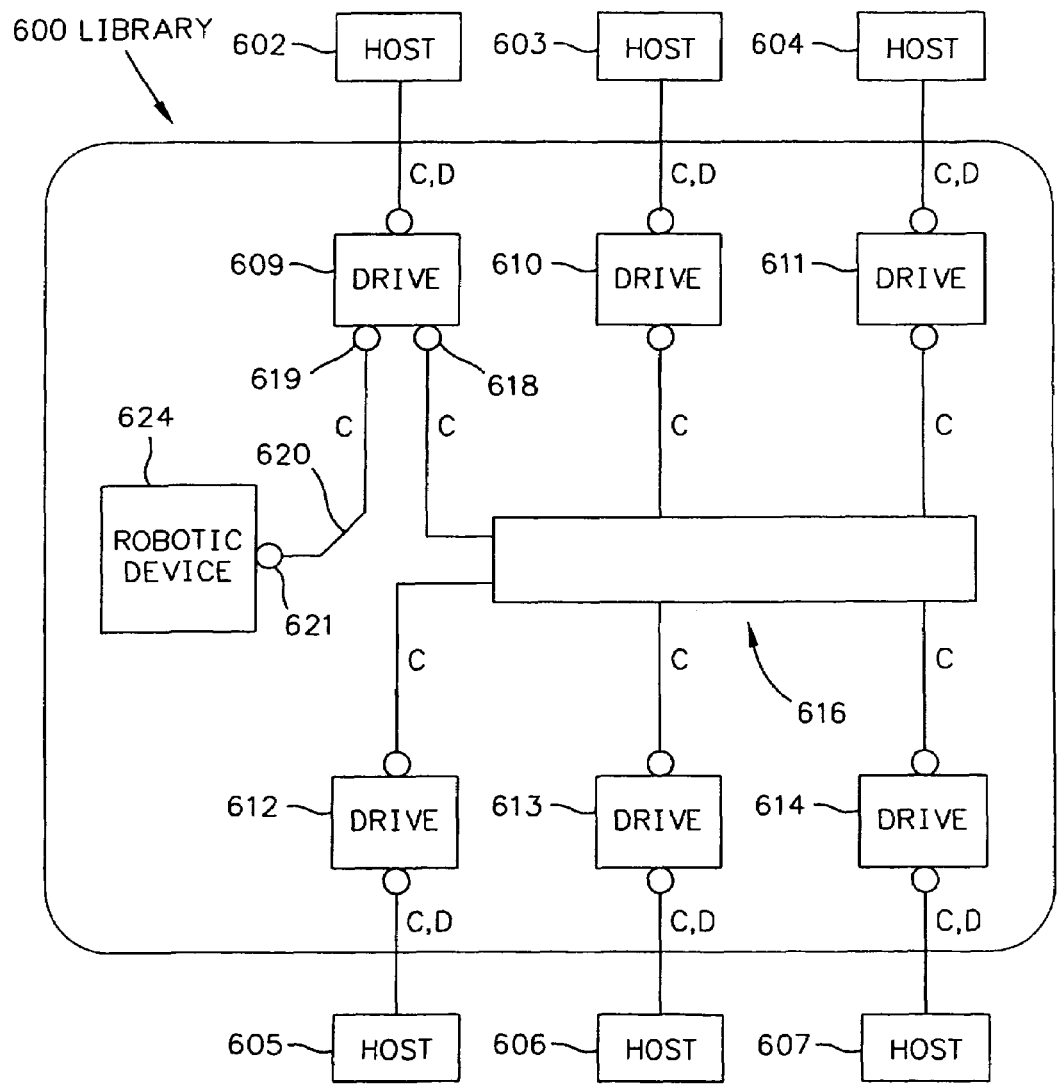
FIG. 6 is a block diagram of the hardware components and interconnections of a multi-host data storage library with multiple relay drives interconnected by a communications loop and accessing a shared robotic device through a master drive directly coupled to the robotic device, in accordance with the invention.

FIG. 6 illustrates still another embodiment of library according to the invention, in the form of a library 600. Generally, the library 600 includes drives connected with a common loop 616, where one of the drives is coupled to the robotic device.

More particularly, the library 600 is attached to multiple hosts 602-607, numbering six in the illustrated example. As shown, the hosts 602-607 are coupled to media drives 609-614, numbering six in the present example. FIG. 6 illustrates a one-to-one connection between hosts and media drives, all drives therefore constituting relay drives. Nonetheless, any host may be coupled to multiple drives, if desired where one or all drives are coupled to the loop 616. Additionally, any drive may be connected to multiple hosts. Although none are shown, orphan drives not coupled to the loop 616 may also be provided.

The hosts 603-607 send robotic device management signals through their attached drives to the communications loop 616. For example, the host 603 sends its robotic device management signals to the loop 616 through the drive 610, and the host 607 sends its robotic device management signals to the loop 616 through its drive 614. The loop 616 conveys these signals to the master drive 609, which ultimately directs the signals to a robotic device 624. The master drive 609 includes a drive port 618 coupled to the loop 616, as well as a robotic device port 619 coupled to the robotic device 624 via a communications path 620 and drive port 621.

The master drive 609 also sends robotic device management signals of its host 602 to the robotic device 624; these signals, however, do not transit the loop 616 since the master drive 609 is directly connected to the robotic device 624. The various drives, ports, hosts, communication paths, loop, robotic device, and other components may be implemented using the hardware components such as those discussed above.

Digital Data Processing Apparatus

Figure 7:
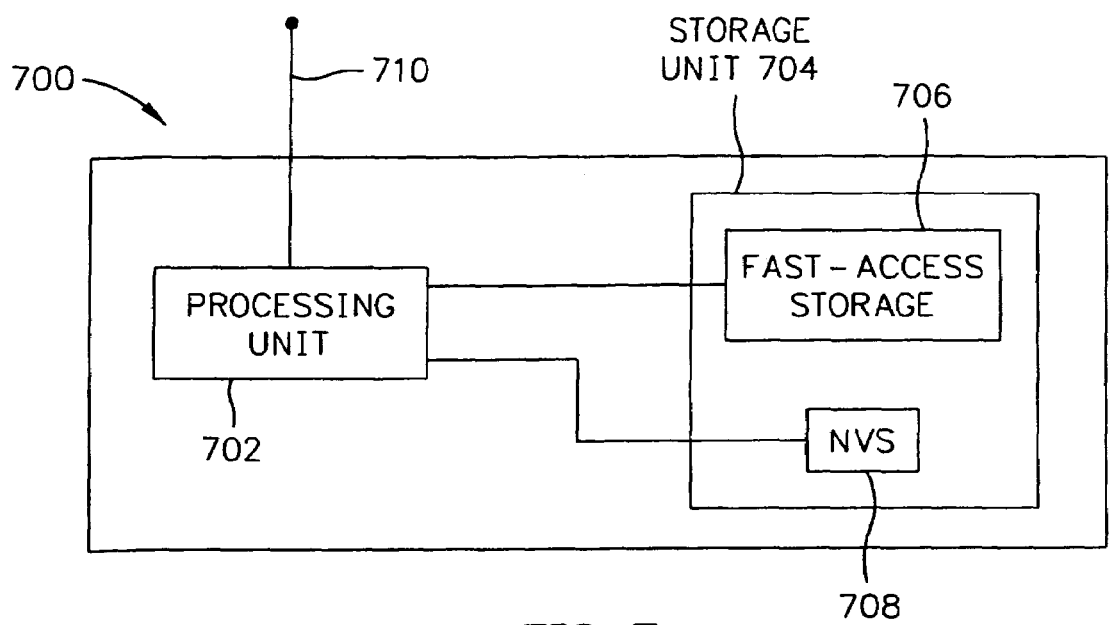
FIG. 7 is a block diagram of one embodiment of a general purpose digital data processing apparatus according to the invention.

As discussed in the context of the illustrative library configurations discussed above, certain intelligent processing is needed to operate the libraries of the invention. Preferably, this processing is performed by one or more digital data processing apparatus(es), this aspect constituting still another aspect of the invention. Such a digital data processing apparatus may embodied by various hardware components and interconnections, depending upon the specific needs of the application. FIG. 7 shows an example of one general purpose digital data processing apparatus 700.

The apparatus 700 includes a processing unit 702, such as a microprocessor or other processing machine, coupled to a storage unit 704. In the present example, the storage unit 704 includes a fast-access memory 706 and nonvolatile storage 708. The fast-access memory 706 preferably comprises random access memory, and may be used to store the programming instructions executed by the processing unit 702 during such execution. The nonvolatile storage 708 may comprise, for example, one or more magnetic data storage disks such as a "hard drive", a tape drive, flash PROM, ROM, battery backup RAM, or any other suitable storage device. The apparatus 700 also includes an input/output 710, such as a line, bus, cable, electromagnetic link, or other means for exchanging data with the processing unit 702.

Despite the specific foregoing description, ordinarily skilled artisans (having the benefit of this disclosure) will recognise that the apparatus 700 may be still implemented in a machine of different construction, without departing from the scope of the invention. As a specific example, one of the components 706/708 may be eliminated; furthermore, the storage unit 704 may be provided on-board the processing unit 702, or externally to the apparatus 700 if desired.

Logic Circuitry

In contrast to the digital data processing apparatus discussed above, a different embodiment of the invention uses logic circuitry instead of computer-executed instructions to implement some or all of the data processing features of the robotic device and/or media drives. Depending upon the particular requirements of the application in the areas of speed, expense, tooling costs, and the like, this logic may be implemented by constructing an application-specific integrated circuit ("ASIC") having thousands of tiny integrated transistors. Such as ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

OPERATION

In addition to the libraries and other hardware embodiments described above, a different aspect of the invention concerns a method for operating a data storage library.

Signal-Bearing Media

Such a method may be implemented, for example, by operating one or more digital data processing apparatus(es) to execute machine-readable instructions, as mentioned above. Also as mentioned above, these digital data processing apparatuses may be embodied by hosts, controllers, drives, or other components of a library.

Within such components, the machine-readable instructions may reside in various types of signal-bearing media. In this respect, one aspect of the present invention concerns a programmed product, comprising signal-bearing media tangibly embodying a program of machine-readable instructions executable by a digital data processor to perform a method to operate a data storage library.

The robotic device 106 includes the processing unit 114 and a media transport mechanism 118 coupled to the processing unit 114. The mechanism 118 includes servos, motors, arms, grippers, sensors and other robotic, mechanical and electrical equipment to perform functions that include (at least) the transportation of media items among library components including the drive 104, various storage bins (not shown), import/export slots, etc. The mechanism 118 may, for example, comprise an autoloader mounted to the drive 104, a robotic arm housed inside a mass storage library, or another suitable device. As a more particular example, the mechanism 118 may comprise a robotic arm from an IBM 3494 data storage library.

The processing unit 114 enables the robotic device 106 to respond to high-level robotic device management signals originating with the host 102. As an example, some of these signals may comprise media movement commands, each identifying a particular media item, a current media location, and a desired media destination. Possible media locations and destinations include, for example, the drive 104, the storage bins (not shown), import/export shelves, etc. The processing unit 114 receives these high-level signals from the host 102, via the path 110, processing unit 112, and dual purpose path 108. The processing unit 114 uses these signals to generate more specific control signals compatible with the equipment of the mechanism 118; in the case of a high-level media movement command, the more specific control signals of the processing unit 114 would specifically direct the mechanism 118 to shift, rotate, grip, and other actions having the combined effect of achieving the desired media movement.

Thus, the high-level control signals from the host 102 may simply direct the robotic device 106, for example, to load a media item from storage bin number 891204 to the drive 104. In contrast, signals responsively generated by the robotic device's processing unit 114 would specifically instruct the mechanism 118 to effectuate vertical and horizontal movements, grip and release actions, rotating or pivoting, and any other movement appropriate to carry out the host's high-level media movement command.

Figure 8:
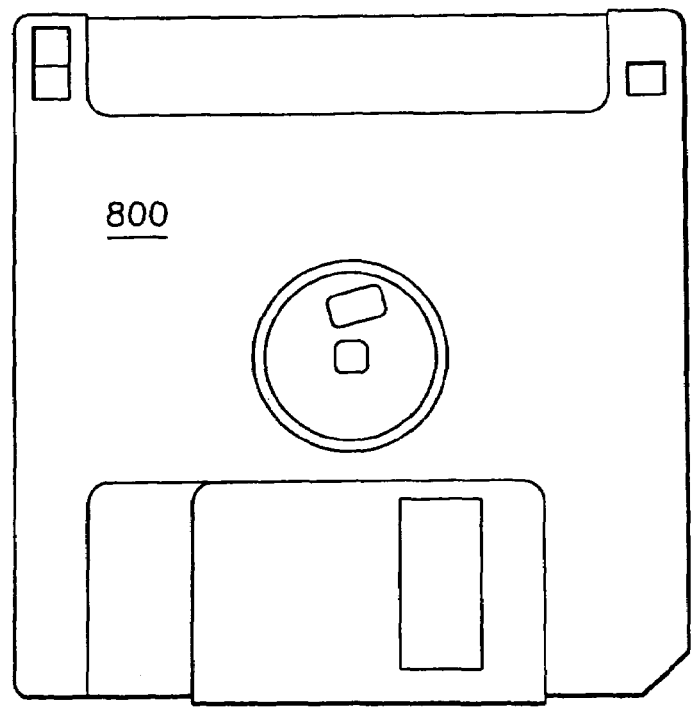
FIG. 8 is a perspective view of one embodiment of an article of manufacture according to the invention.

This signal-bearing media may comprise, for example, RAM (not shown) contained within the storage unit 704 of a digital data processing apparatus 700 (FIG. 7). Alternatively, the instructions may be contained in another signal-bearing media, such as a magnetic data storage diskette 800 (FIG. 8), directly or indirectly accessible by the processing unit 702 of the apparatus 700. Whether contained in the apparatus 700 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM, etc.), an optical storage device (e.g. WORM, CD-ROM, DVD, optical tape, etc.), paper "punch" cards, or other suitable signal-bearing media including transmission media such as digital and analog and communication links and wireless. In an illustrative embodiment of the invention, the machine-readable instructions may comprise lines of compiled C++ language code.

Logic Circuitry

In contrast to the signal-bearing medium discussed above, the method aspect of the invention may be implemented using logic circuitry, without using a processor to execute instructions. In this embodiment, the logic circuitry is implemented in the hosts, controllers, drives, or other components of the library as appropriate, and is configured to perform operations to implement the method of the invention. The logic circuitry may be implemented using many different types of circuitry, as discussed above.

Operational Sequence: Single Host

Figure 9:
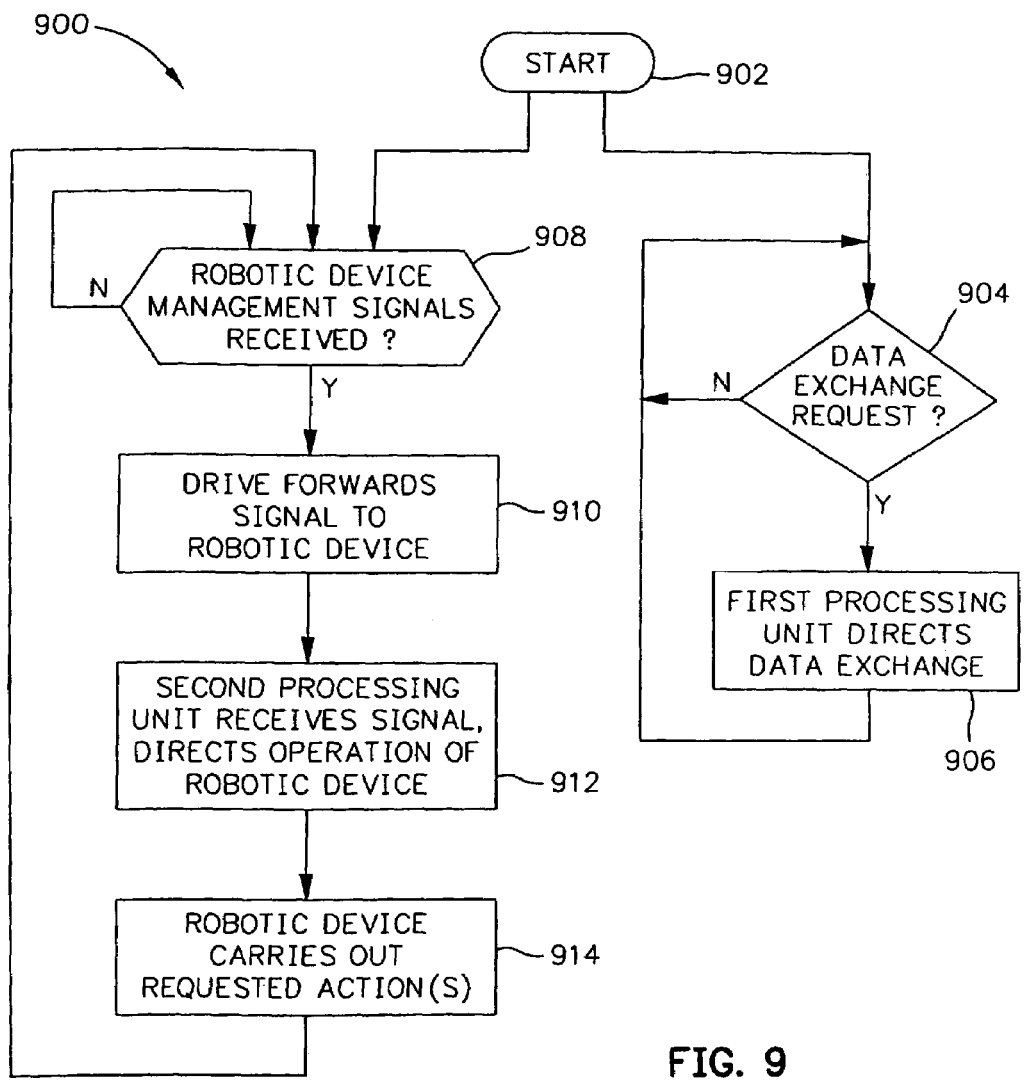
FIG. 9 is a flowchart of a sequence for operating a single host data storage library with a shared data/control path between a drive and a robotic device, in accordance with the invention.

FIG. 9 shows a sequence of method steps 900 to illustrate one example of the method aspect of the present invention, where one media drive is coupled to a robotic device and a host, and the media drive provides a control path from the host to the robotic device. For ease of explanation, but without any limitation intended thereby, the example of FIG. 9 is described in the context of the library 100 (FIG. 1) described above.

After the steps 900 are initiated in task 902, two parallel processes begin: tasks 908-914, and tasks 904-906. Tasks 904-906 begin in step 904, where the processing unit 112 determines whether it has received a control signal comprising a request to exchange data between the host 102 and a media item mounted to the media drive 104. Such a signal may be referred to as a "data exchange control signal" or "data exchange command." Although not explicitly shown, this control signal is received from the host 102 over the communications path 108.

If a data exchange control signal has been received, the processing unit 112 in step 906 directs the drive 104 to conduct the requested data exchange. Since this signal only pertains to the drive 104, the processing unit 112 withholds the data exchange control signal from the robotic device 106. If the removable media is embodied by magnetic tape, for example, step 906 may involve the sub-steps of the processing unit 112 sending control signals to mechanical and electrical subcomponents of the drive 104 to effect advancing or rewinding the tape to a desired location, partition, or data item, and reading data from the tape or writing data to the tape. Also as a part of this step, data may be read from the media and sent to the host 102, and/or data received from the host 102 and written to the media. As many different specific procedures for exchanging data with removable storage media are well known in the art, these are not described further. After step 906, the routine returns to step 904 to receive the next data exchange request. In some cases, multiple instances of steps 904-906 may occur simultaneously. For example, when multiple hosts are communicating with the drive 104.

Concurrently with steps 904-906, steps 908-914 are performed. In contrast to steps 904-906, which concern the use of the drive 104 to store and/or retrieve data, steps 908-914 concern the receipt of "robotic device management signals" (also called "media transport commands") from the host 102, and the drive's response thereto. More particularly, in step 908 the media drive's processing unit 112 determines whether a control signal comprising a robotic device management signal has been received from the host 102 via the communications path 108. As an example, typical robotic device management signals may comprise control signals directing the robotic device to load a media item from a storage bin or I/O facility into the drive, transfer a media item from the drive to a storage bin or I/O facility, or to conduct various inventory management chores such as introducing new media items into the library, verifying or determining the location of a media item or the contents of a particular storage bin, etc.

If the processing unit 112 has received a robotic device management signal, the processing unit 112 in step 910 forwards this signal to the processing unit 114 of the robotic device 106. In response, the processing unit 114 in step 912 directs the operation of the media transport mechanism 118 to effect the desired operation. As a more particular example, the processing unit 114 in step 912 may issue detailed commands, specifically instructing a robotic arm to move horizontally and vertically, rotate, grasp, and perform other specific motions needed to effect the robotic device management signals specified by the host 102. In step 914, the robotic device 106 carries out these requested motions, then the routine 900 reverts to step 908. In some cases, multiple instances of steps 908-914 may occur simultaneously, for example, when multiple hosts are communicating with the drive 104.

As an optional enhancement to the foregoing description of steps 910-914, the drive 104 may process certain designated robotic device management signals. For instance, the drive 104 may be instructed, programmed, preconfigured, recruited by the robotic device 106, or otherwise configured to handle certain robotic device management commands that do not require action by the robotic device 106. Some examples include rejecting commands of improper syntax, rejecting requests for media items of an impermissible logical partition (discussed below), confirming that a command has already been completed, etc.

Single Master/Relay

Figure 10:
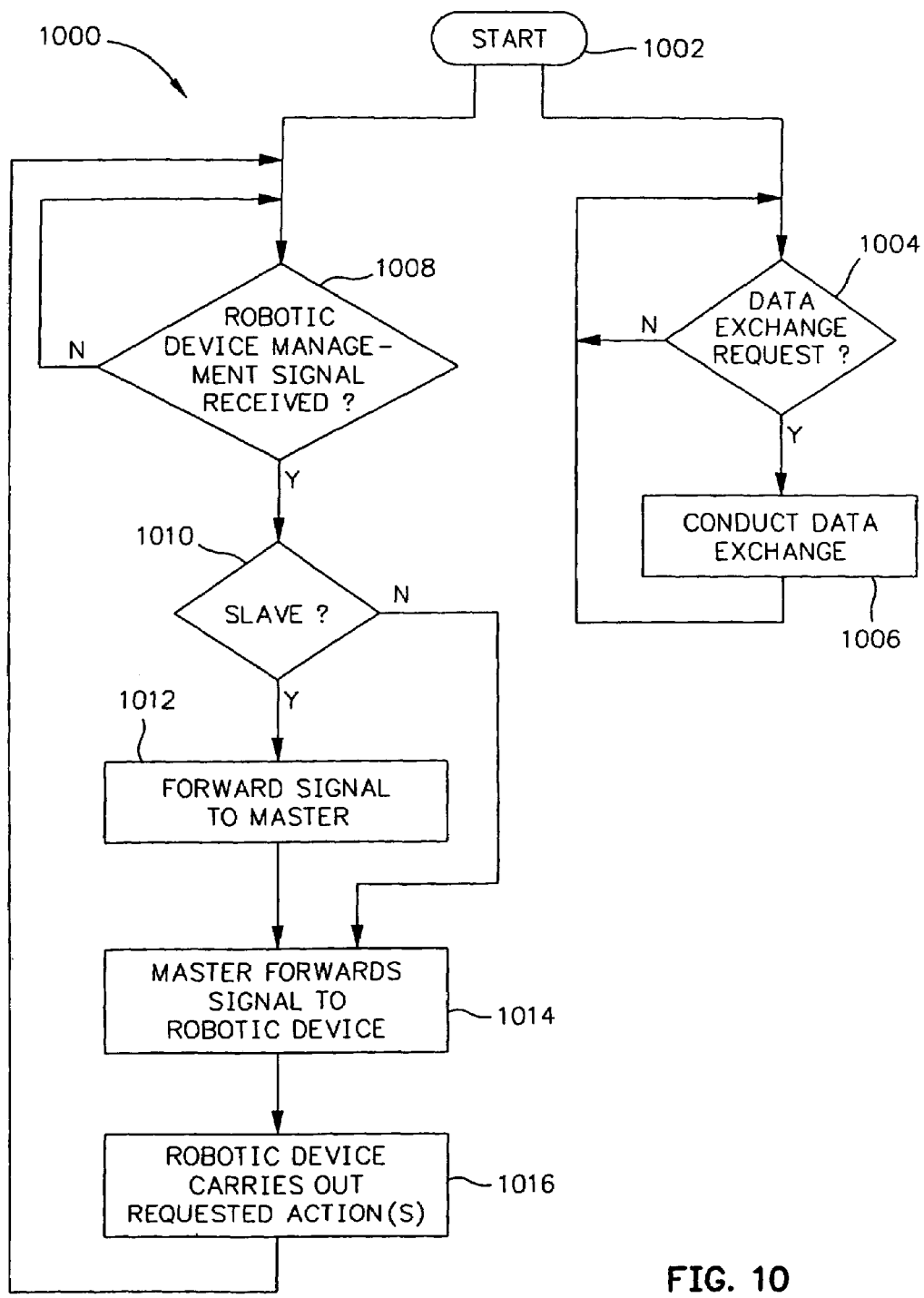
FIG. 10 is a flowchart of a sequence for operating a multi-host data storage library with master/relay configured drives having a shared data/control path to a shared robotic device through the master drive, in accordance with the invention.

FIG. 10 shows a sequence of method steps 1000 to illustrate another example of the method aspect of the present invention, where drives are arranged in master/relay configuration. For ease of explanation, but without any limitation intended thereby, the example of FIG. 10 is described in the context of the library 200 (FIG. 2) described above.

After the steps 1000 are initiated in task 1002, two parallel processes begin: steps 1004-1006, and steps 1008-1016. Steps 1004-1006 begin in step 1004, where each drive 206-207, whether master or relay, individually determines whether it has received a control signal comprising request to exchange data between its respective host 202-203 and a media item mounted to the drive 206-207. Although not explicitly shown, each control signal is received from one of the hosts 202-203 over a respective one of the communications paths 212, 216.

If a drive has received a data exchange control signal, the drive in step 1006 conducts the requested data exchange. If the removable media is embodied by magnetic tape, for example, step 1006 may involve the sub-steps of a processing unit (not shown) within the drive sending control signals to mechanical and electrical subcomponents of the drive to effect advancing or rewinding the tape to a desired location, partition, or data item, and reading data from the tape or writing data to the tape. Also as a part of this step, data may be read from the media and sent to a host 202-203, and/or received from a host 202-203 and written to the media. Since this signal only pertains to the drive 104, the processing unit 112 withholds the data exchange control signal from the robotic device 106. After step 1006, the routine returns to step 1004 to receive the next data exchange request.

Concurrently with steps 1004-1006, steps 1008-1016 are performed. In contrast to steps 1004-1006, which concern the use of a drive to store and/or retrieve data, steps 1008-1016 concern the receipt of robotic device management signals from the hosts 202-203, and the responses thereto. More particularly, in step 1008 each drive 206-207 determines whether a control signal comprising a robotic device management signal has been received from the respective one of the hosts 202-203, via the corresponding communications path 212/216. As an example, typical robotic device management signals may comprise control signals directing the robotic device to load a media item from a storage bin or I/O facility into the drive, transfer a media item from the drive to a storage bin or I/O facility, or to conduct various inventory management chores such as introducing new media items into the library, verifying or determining the location of a media item or the contents of a particular storage bin, etc.

If a drive 206-207 has received a robotic device management signal, further action depends on whether the receiving drive is a master or relay drive. If the drive is a relay (i.e., drive 207 in the example of FIG. 2), the drive 207 forwards the received signal to the master drive (i.e., drive 206 in the example of FIG. 2). Step 1014 is performed after step 1012; alternatively, step 1014 may be performed without step 1012 if the robotic device management signal was originally received by the master drive 206. In step 1014, the master drive 206 forwards the robotic device management signal to the robotic device. In response, the robotic device 210 in step 1016 carries out the requested robotic device management signal, and control returns to step 1008. Examples of further operations useful to carry out the requested robotic device management signals are discussed above.

Multiple Relay Drives

As another example, the sequence 1000 may also be applied in the context of libraries with multiple relay drives, and/or drives not coupled to the master drive. One example is provided by the library 300 (FIG. 3). In this hardware embodiment, the step 1004 contemplates data exchanges at all drives, even including orphan drives (e.g., 309) not coupled to the master drive 306. Since the host 304 has an orphan drive 309, the host 304 must ensure that robotic device management signals are only directed to the relay drive and not the orphan drive 309 in order to successfully reach the master drive 306.

Direct Drive/Robotic Device Coupling

Figure 11:
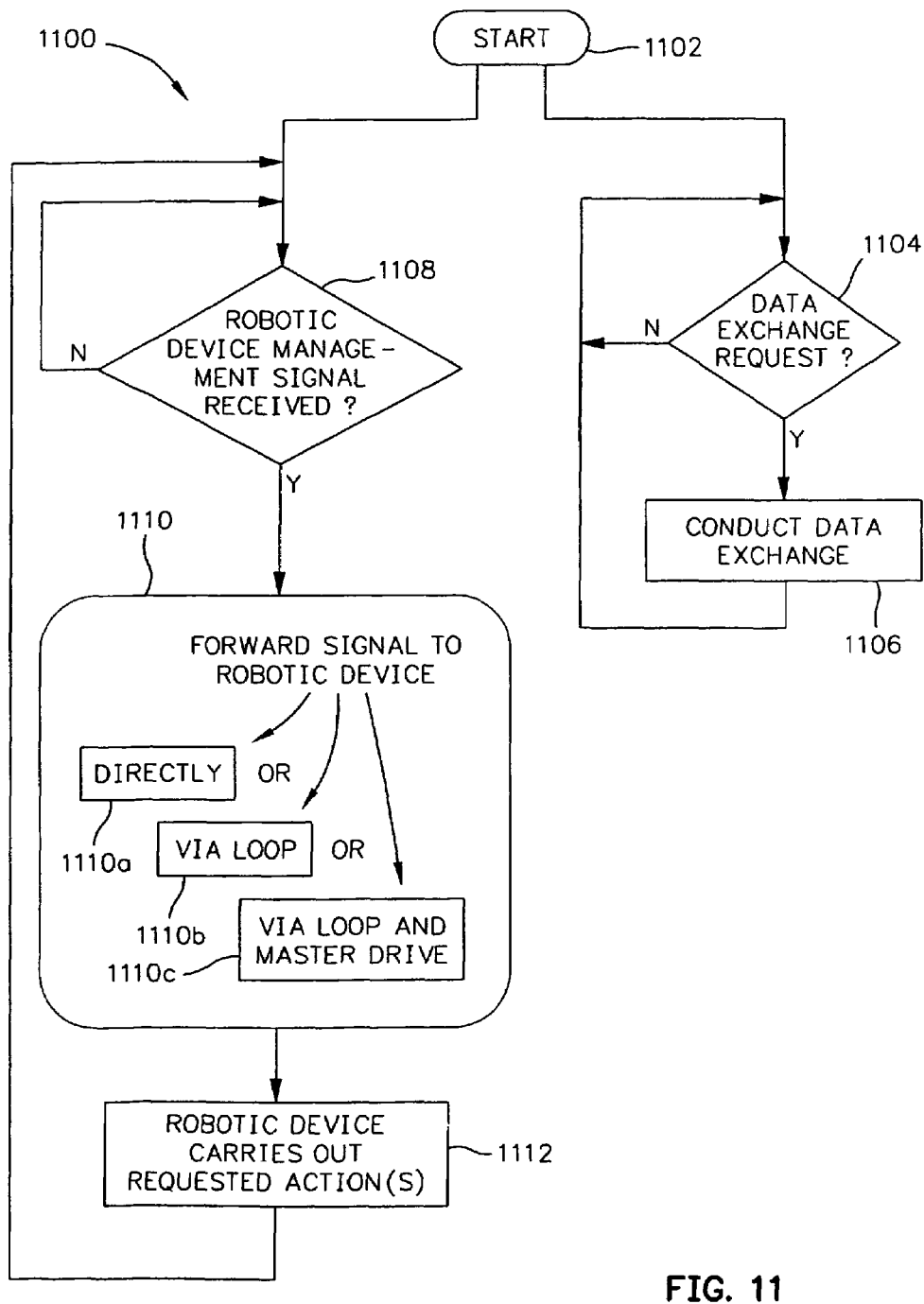
FIG. 11 is a flowchart of a sequence for operating a multi-host data storage library with multiple drives accessing a shared robotic device through various other means in accordance with the invention.

FIG. 11 shows a sequence of method steps 1100 to illustrate another example of the method aspect of the present invention, where multiple media drives are directly coupled to a shared robotic device. For ease of explanation, but without any limitation intended thereby, the example of FIG. 11 is first described in the context of the library 400 (FIG. 4) described above.

After the steps 1100 are initiated in task 1102, two parallel processes begin: steps 1104-1106, and steps 1108-1112. Steps 1104-1106 begin in step 1104, where each drive 408-413, whether a relay or orphan drive, individually determines in step 1104 whether it has received a control signal comprising a request to exchange data between its respective host 402-405 and a media item mounted to the drive 408-413. Although not explicitly shown, each such control signal is received from one of the hosts 402-405 over a respective one of the communications paths 416-418, 428-430.

If a drive has received a data exchange control signal, the drive in step 1106 conducts the requested data exchange. If the removable media is embodied by magnetic tape, for example, step 1106 may involve the sub-steps of a processing unit (not shown) within the drive sending control signals to mechanical and electrical subcomponents of the drive to effect advancing or rewinding the tape to a desired location, partition, or data item, and reading data from the tape or writing data to the tape. Also as a part of this step, data may be read from the media and sent a host 402-405, and/or received from a host 402-405 and written to the media. Since this signal only pertains to the drive 104, the processing unit 112 withholds the data exchange control signal from the robotic device 106. After step 1106, the routine returns to step 1104 to receive the next data exchange request.

Concurrently with steps 1104-1106, steps 1108-1112 are performed. In contrast to steps 1104-1106, which concern the use of a drive to store and/or retrieve data, steps 1108-1112 concern the receipt of robotic device management signals from the hosts 402-405, and the responses thereto. More particularly, in step 1108 each relay drive 408 and 411-413 determines whether it has received a robotic device management signal from a respective one of the hosts 402-405, via one of the corresponding communications paths 416, 428-430. As an example, typical robotic device management signals may comprise control signals directing the robotic device to load a media item from a storage bin or I/O facility into the drive, transfer a media item from the drive to a storage bin or I/O facility, or to conduct various inventory management chores such as introducing new media items into the library, verifying or determining the location of a media item or the contents of a particular storage bin, etc.

If a drive 408/411-413 has received such a robotic device management signal, the drive forwards the signal directly to the robotic device 444, as shown by sub-task 1110a. As a specific example, a media movement command may pass from the drive 408 to the robotic device 444 via the port 425, the communication path 424, and the port 426. After step 1110a, the robotic device 444 in step 1112 carries out the requested command, and control returns to step 1108. Optionally, as discussed above, the dual purpose drives such as 408, 411-413 may process certain robotic device management commands.

Loop Connection to Robotic Device

As another example, with reference to FIGS. 11 and 5, the sequence 1100 may also be applied in the context of libraries with loop connected drives, as exemplified by the library 500. In this hardware embodiment, step 1110 contemplates the forwarding of robotic device management signals from the drives 508-509 and 511-513 to the robotic device 534 via the loop 516, path 548, and port 550, as shown by step 1110b. Alternatively, with the hardware environment of FIG. 6, step 1110 is implemented by task 1110c. In step 1110c, the robotic device management signal is forwarded from its host 602 or one of the relay drives 610-614 to the master drive 609 via the loop 616, whereupon the master drive 609 directs the signal to the robotic device 624. More particularly, the master drive 609 receives signals at its port 618, and subsequently forwards these signals to the robotic device 624 using the port 619, communications path 620, and port 621.

Partitioning

Another aspect of the present invention concerns a process for establishing a partitioning scheme for a library, and thereafter operating the library (such as 400) according to the established partitioning scheme. As one example, some approach for allocating the inventory of media items among the media drives may be inherent to the operational sequences of FIGS. 9-11. In other words, in carrying out robotic device management signals (media transport commands), the library may honor a predetermined scheme for allocating media items among the drives.

Figure 13:
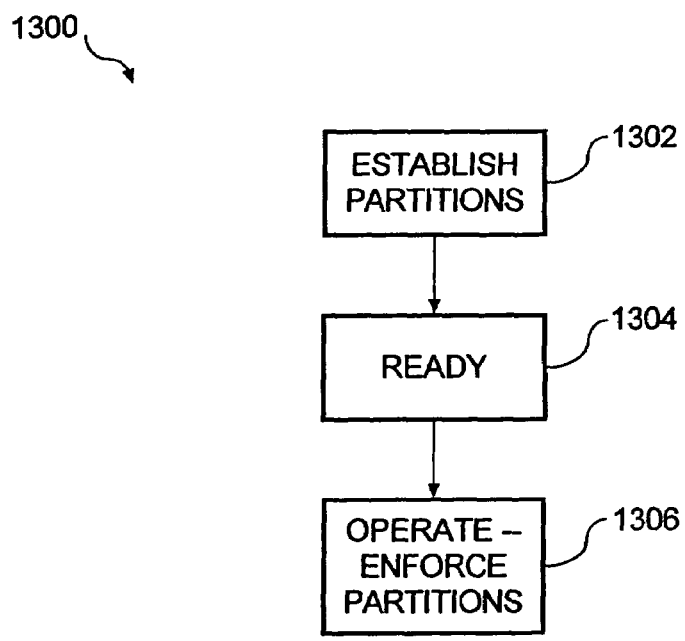
FIG. 13 is a flowchart of a sequence for configuring and operating a data storage library to restrict host access by partitions of various library components, in accordance with the invention.

Nonetheless, FIG. 13 is now introduced in order to more exhaustively describe one exemplary sequence 1300 for establishing then utilizing a partitioning scheme according to the invention. For ease of illustration, without any limitation, the sequence 1300 is described in the context of the library 400 of FIG. 4 and the media drive 1250 of FIG. 12. In step 1302, a partitioning scheme is selected and then implemented by giving notice to the robotic device 444.

Each partition defines a set of facilities in the library to be exclusively used by one host. The set of facilities in a partition may comprise any one or more of the following library components: one or more storage bins, one or more media items, one or more media drives, or a combination of the foregoing. Media items may be identified, for example, by serial number, volume table of contents (VTOC), row/column locations in the storage bins, pre-defined subsections of the bins, or another basis. Partition information may also identify the host associated with a partition; alternatively, if connections are checked or known by pre-set hardware configuration to couple only one host to each media drive, the host need not be identified. In the illustrated example, each media drive is a member of one partition only.

Step 1302 may be carried out in various ways. For instance, an operator may designate the partitions by transmitting appropriate commands, sending instructions, uploading data, making data entry, or supplying other input to the library. This may be performed, for example, upon original installation of the library, reconfiguration of the library when adding or removing a component, as an independent step, or another time. Partition information may originate from various other sources, such as a host, a software or hardware trigger, an auto configure sequence, a system administrator's console (not shown) coupled to the robotic device, etc. In step 1302, the robotic device 444 stores a record of the partitioning scheme.

As a different example, the robotic device 444 may be advised of the partitioning scheme in other ways. For example, the robotic device 444 may automatically discern desired partitions as shown in the following references: (1) U.S. Pat. No. 6,185,165 entitled "Positionable Vision Indicators for Configuring Logical Libraries," issued Feb. 2, 2001, and (2) U.S. Pat. No. 6,044,442 entitled "External Partitioning of an Automated Data Storage Library into Multiple Virtual Libraries for Access by a Plurality of Hosts," issued Mar. 28, 2000. The entire content of the foregoing patents are hereby incorporated herein by reference. In any case, the robotic device stores a record of the established partitioning scheme in step 1302. As one example, this record may be stored locally at the robotic device 444.

As a further option, the robotic device 444 in step 1302 may recruit one or more media drives (such as 408) to assist in enforcing the established partitions. Namely, the robotic device 444 in step 1302 may forward partition information as necessary to one or more media drives, along with instructions for the media drives to act in the future to consider host commands according to the established partitions, and pass the commands through to the robotic device (if proper) or reject, drop, flag, or otherwise dishonor commands that are improper. More particularly, since each media drive is associated with one partition, the robotic device 444 may direct each media drive to only honor commands that are directed to that media drive, and concerning media items or storage bins under the associated partition. Media drives honor media transport commands by passing them through to the robotic device on the port 1260. In other words, the robotic device instructs the media drives to dishonor host commands that seek access to library components of a partition not associated with that media drive. Saving the need to involve the robotic device, media drives may dishonor improper host commands by rejecting, dropping, ignoring, or otherwise refusing to carry them out. The media drives may store their partition instructions in their respective media maps (such as 1264, FIG. 12). Thus, a different media map is maintained for each drive, each map listing all media items in the same partition as that drive. Optionally, the media maps may further name each media item's position, e.g., housed in a storage bin, in-transit mounted in a drive, etc.

After step 1302, the library 400 (and robotic device 444 in particular) stand ready to operate (step 1304), and begin enforcing the established partitions as needed. Namely, in step 1306 the library 400 operates so as to implement the established partitioning schemes. Step 1306 may be implemented by any of the sequences 900, 1000, or 1100 (for example), wherein the robotic device 444 additionally operates to evaluate and selectively perform hosts' media transport commands if they comport with the partitioning scheme in effect. More particularly, the robotic device 444 ensures that each host can only access library components designated under that host's partition. For instance, if a host issues a media transport command to remove a certain media item from a storage bin and load it to a media drive, the robotic device 444 rejects the host command unless the media item (or storage bin) and the requested media drive both fall under the partition associated with the media drive where the host command was received. In the case of a media drive that has been recruited to help enforce partitioning, the media drive may work in various ways. For instance, the media drive may filter, drop, or reject improper host commands before they even reach the robotic device. These actions are performed in accordance with contents of the media drive's media map 1264. Accordingly, the robotic device (or media drive if so equipped) dishonors host commands that arrive via one media drive and seek access to library components of a partition not associated with that media drive.

In the foregoing embodiment, the media inventory is logically partitioned, where the media items of each partition are exclusively assigned to a particular drive (or to a set of multiple drives). The result is that some or all library components are logically partitioned among the hosts, such that the library components appear to be completely separate logical libraries. This approach has the advantage of minimizing allocation overhead, since the drives do not compete for the same media items. Furthermore, each media map may be stored and maintained by the associated drive, lessening the media allocation overhead performed by the hosts and robotic device.

Optionally, some library components (or even the entire library) may be fully accessible by each drive, in which case the robotic device may be directed to load any media item to any drive. In one example of this embodiment, there is a universal media map that is utilized by the robotic device (or commonly accessible by the media drives), this map listing each media item and its location, either housed in a storage bin or mounted to a drive.

Redundant Access to Robotic Device

Another feature, inherent to some of the operational sequences discussed above, is the redundancy of control paths to the shared robotic device. Specifically, in libraries using multiple master or relay drives, each such drive provides a redundant path for robotic device control signals to reach the shared robotic device. Thus, if a hardware component fails or is otherwise unavailable, a control signal can be sent to the robotic device through another master or relay drive.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A data storage library apparatus for managing a plurality of portable data storage media items, comprising:
 a robotic media transport device responsive to media transport commands to transport the media items among media locations comprising media storage bins and media drives;
 one or more multi-purpose media drives, each comprising:
  a media access mechanism configured to removably receive media items and exchange data therewith;
  at least one host port;
  at least one robotic device port coupled to the robotic media transport device;
  a controller coupled to the media access mechanism, host port, and robotic device port and programmed to perform operations comprising:
   responsive to receiving host commands upon the host port, distinguishing between (1) data exchange commands directing the media access mechanism to exchange data with a media item, and (2) media transport commands;
   processing received data exchange commands by performing operations comprising at least one of the following: directing the media access mechanism to exchange data between the host port and a media item received by the media access mechanism in accordance with the data exchange command, returning status information concerning the media drive upon the host port;
   processing received media transport commands by forwarding such commands to the robotic media transport device via the robotic device port;
  wherein at least one of the robotic media transport device and the drives is programmed to restrict host access to components of the library according to predefined logical partitions, each partition defining a different group of one or more of the following library components: one or more media items, one or more media drives, one or more media storage locations.

2. The apparatus of claim 1, where at least one of the robotic media transport device and the drives is programmed to restrict host access to components of the library according to the predefined logical partitions by instructing at least one media drive to dishonor host commands that seek access to library components of a partition not associated with that media drive.

3. The apparatus of claim 1,
 each media drive further comprising a media map designating an extent of any predefined logical partitions associated with the media drive;
 each media drive controller being further programmed to restrict host access according to the predefined logical partition shown by the media drive's media map.

4. The apparatus of claim 1, where each partition is exclusively associated with a different set of one or more media drives in the library, and where the robotic media transport device is programmed such that the operation of restricting host access to library components according to predefined logical partitions comprises:
 for all media transport commands arriving from a particular media drive, limiting host access to components of any partition associated with that media drive.

5. The apparatus of claim 1, where each partition is exclusively associated with a different set of one or more media drives in the library, and where the robotic media transport device is programmed such that the operation of restricting host access to library components according to predefined logical partitions comprises:
 dishonoring host commands that arrive via one media drive and seek access to library components of a partition not associated with that media drive.

6. A data storage library for managing a plurality of portable data storage media items, comprising:
 a robotic media transport device responsive to robotic-device-directed commands to transport the media items among media locations comprising media storage bins and multiple media drives;
 multiple media drives, configured to removably receive media items and exchange data therewith, each said drive including at least one host port to receive thereon control signals including (1) drive-directed commands directing an exchange of data with a media item received by the media drive and (2) the robotic-device-directed commands;
 at least one of the robotic media transport device and the drives is programmed to logically partition library components among different media drives and represent to hosts that the partitioned library components exist in separate logical libraries.

7. A method of managing a data storage library that includes a plurality of portable data storage media items, a robotic media transport device responsive to media transport commands to transport the media items among media locations including media storage bins and media drives, and one or more multi-purpose media drives including a host port and a robotic device port, the method comprising operations of:
 operating each media drive to perform operations comprising:
  responsive to receiving host commands upon the host port, distinguishing between (1) data exchange commands directing the media access mechanism to exchange data with a media item, and (2) media transport commands;
  processing received data exchange commands by performing operations comprising at least one of the following: directing the media access mechanism to exchange data between the host port and a media item received by the media access mechanism in accordance with the data exchange command, returning status information concerning the media drive upon the host port;
  processing received media transport commands by forwarding such commands to the robotic media transport device via the robotic device port;
 restricting host access to components of the library according to predefined logical partitions, each partition defining a different group of one or more of the following components: one or more media items, one or more media drives, one or more media storage locations.

8. The method of claim 7, where the operation of restricting host access to components of the library according to the predefined logical partitions comprises:
 the robotic media transport device instructing at least one media drive to dishonor host commands seek access to library components of a partition not associated with that media drive.

9. The method of claim 7, where:
 each media drive further includes a media map designating an extent of any predefined logical partitions associated with the media drive;

the operation of restricting host access to components of the library according to predefined logical partitions comprises each media drive restricting host access according to the predefined logical partition shown by the media drive's media map.

10. The method of claim 7, where each partition is exclusively associated with a different set of one or more media drives in the library, and where the operation of restricting host access to library components according to predefined logical partitions comprises:
for all media transport commands arriving from a particular media drive, limiting host access components of any partition associated with that media drive.

11. The method of claim 7, where each partition is exclusively associated with a different set of one or more media drives in the library, and where the operation of restricting host access to library components according to predefined logical partitions comprises:
dishonoring host commands that arrive via one media drive and seek access to library components of a partition not associated with that media drive.

12. A media drive for use in a data storage library, the drive comprising:
a media access mechanism;
at least one host port to exchange signals with one or more hosts;
at least one robotic device port to exchange signals with a robotic media transport device;
a processing unit coupled to the media access mechanism and the ports, and being programmed to perform operations comprising:
media item loaded therein and the host port responsive to data exchange commands received on the host port;
forwarding at least some media transport commands received on the host port to the robotic media transport device;
restricting host access to components of the library according to predefined logical partitions, each partition designating a different group of one or more of the following library components: one or more media items, one or more media drives, one or more media storage locations.

13. The media drive of claim 12 the processing unit further programmed to perform operations comprising:
responsive to recognizing that a media transport command fails to meet one or more predefined criteria, processing the command to the exclusion of the robotic media transport device by returning an error message to a host.

* * * * *